(12) United States Patent
Kim et al.

(10) Patent No.: US 10,139,692 B2
(45) Date of Patent: Nov. 27, 2018

(54) LIGHT CONTROLLING DEVICE, TRANSPARENT DISPLAY DEVICE INCLUDING THE SAME AND METHOD FOR MANUFACTURING THE SAME

(71) Applicant: LG DISPLAY CO., LTD., Seoul (KR)

(72) Inventors: Jae-Hyun Kim, Seoul (KR); JiYoung Ahn, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/373,245

(22) Filed: Dec. 8, 2016

(65) Prior Publication Data

US 2017/0168363 A1 Jun. 15, 2017

(30) Foreign Application Priority Data

Dec. 15, 2015 (KR) ........................ 10-2015-0178945

(51) Int. Cl.
| | | |
|---|---|---|
| *G02F 1/153* | (2006.01) | |
| *G02F 1/03* | (2006.01) | |
| *G02F 1/01* | (2006.01) | |
| *G09G 3/19* | (2006.01) | |
| *H04N 9/16* | (2006.01) | |
| *G02F 1/155* | (2006.01) | |
| *G02F 1/1333* | (2006.01) | |

(Continued)

(52) U.S. Cl.
CPC .......... *G02F 1/155* (2013.01); *G02F 1/13439* (2013.01); *G02F 1/133345* (2013.01); *G02F 1/134309* (2013.01); *G02F 1/161* (2013.01); *G02F 2201/44* (2013.01); *G02F 2203/01* (2013.01)

(58) Field of Classification Search
CPC ...... G02F 1/155; G02F 1/1523; G02F 1/1525; G02F 1/1521; G02F 1/1533; G02F 1/03; G02F 1/0316; G02F 3/16; G02F 1/163; C09K 9/02; B60R 1/088; H04N 9/3137; H04N 9/22
USPC ........ 359/265–275, 277, 245–247, 254, 242; 345/49, 105; 250/70; 348/817; 438/929
See application file for complete search history.

(56) References Cited

U.S. PATENT DOCUMENTS

2004/0041520 A1 * 3/2004 Wu ...................... H01L 27/3288
 313/506
2016/0209721 A1 * 7/2016 Matsumoto ......... G02F 1/13439

FOREIGN PATENT DOCUMENTS

JP 01237527 * 9/1989

* cited by examiner

*Primary Examiner* — Dawayne A Pinkney
(74) *Attorney, Agent, or Firm* — Birch, Stewart, Kolasch & Birch, LLP

(57) ABSTRACT

A light controlling device that may reduce the time required for mode switching from a transmissive mode to a light-shielding mode or from a light-shielding mode to a transmissive mode, a transparent display device including the same, and a method for manufacturing the same are discussed. The light controlling device according to an embodiment includes a first base film and a second base film; first auxiliary electrodes arranged on one surface of the first base film facing the second base film, and patterned at a predetermined interval; second auxiliary electrodes arranged on one surface of the second base film facing the first base film, and patterned at a predetermined interval; a first transparent electrode arranged on the first auxiliary electrodes; a second transparent electrode arranged on the second auxiliary electrodes; and an electrochromic layer arranged between the first transparent electrode and the second transparent electrode.

19 Claims, 13 Drawing Sheets

(51) Int. Cl.
*G02F 1/1343* (2006.01)
*G02F 1/161* (2006.01)

LIGHT CONTROLLING DEVICE, TRANSPARENT DISPLAY DEVICE INCLUDING THE SAME AND METHOD FOR MANUFACTURING THE SAME

CROSS REFERENCE TO RELATED APPLICATIONS

This application claims the priority benefit of the Korean Patent Application No. 10-2015-0178945 filed on Dec. 15, 2015, which is hereby incorporated by reference for all purposes as if fully set forth herein.

BACKGROUND OF THE INVENTION

Field of the Invention

The present invention relates to a light controlling device, a transparent display device including the same, and a method for manufacturing the same.

Discussion of the Related Art

Recently, with the advancement of the information age, display devices for processing and displaying a large amount of information have been promptly developed. More particularly, various display devices have been introduced and spotlighted. Detailed examples of the display devices include liquid crystal display (LCD) devices, plasma display panel (PDP) devices, field emission display (FED) devices, electroluminescence display (ELD) devices, and organic electroluminescent display (OLED) devices.

Recently, the display devices have excellent properties of a thin profile, light weight and low power consumption and thus their application fields have been increased continuously. In particular, in most of electron devices or mobile devices, the display device has been used as one of user interfaces.

Also, studies of a transparent display device through which a user may see objects or images disposed on a rear surface of the display device have been actively made. The transparent display device may have advantages of better use of space, interior and design, and may have various application fields. The transparent display device may solve spatial and temporal restrictions of the existing electron devices by realizing functions of information recognition, information processing and information display as a transparent electron device. For example, the transparent display device may be applied to a window of a building or a car, and thus may be used as a smart window that allows a background to be seen or displays an image.

The transparent display device may be realized as an organic light emitting display device. In this case, the transparent display device has an advantage of low power consumption. However, although the transparent display device has no problem in a contrast ratio under a dark environment, a problem occurs in that a contrast ratio is deteriorated under an environment that light exists. A contrast ratio of a dark environment may be defined as a dark room contrast ratio while a contrast ratio of an environment that light exists may be defined as a bright room contrast ratio. That is, since the transparent display device includes a transmissive area to allow a user to view an object or background disposed on a rear surface, a problem occurs in that a bright room contrast ratio is deteriorated. Therefore, if the transparent display device is realized as the organic light emitting display device, a light controlling device, which includes a light shielding mode shielding light and a transmissive mode transmitting light, is required to prevent a bright contrast ratio from being deteriorated.

Recently, an electrochromic device has been suggested to be used as a light controlling device. The electrochromic device may be realized in a transmissive mode that transmits light in a state that a voltage is not applied, and may have an advantage in that a transmissive mode may be switched to a light-shielding mode at a low driving voltage. However, if the electrochromic device is applied to a light controlling device of a large sized transparent display device such as TV, a problem occurs in that a switching time from a transmissive mode to a light shielding mode or a switching time from a light shielding mode to a transmissive mode is long due to a low response speed of the electrochromic device.

SUMMARY OF THE INVENTION

Accordingly, the present invention is directed to a light controlling device, a transparent display device including the same, and a method for manufacturing the same, which substantially obviate one or more problems due to limitations and disadvantages of the related art.

An advantage of the present invention is to provide a light controlling device that may reduce a switching time from a transmissive mode to a light-shielding mode or a switching time from a light-shielding mode to a transmissive mode, a transparent display device including the same, and a method for manufacturing the same.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a light controlling device according to an embodiment of the present invention comprises a first base film and a second base film; first auxiliary electrodes arranged on one surface of the first base film facing the second base film, and patterned at a predetermined interval; second auxiliary electrodes arranged on one surface of the second base film facing the first base film, and patterned at a predetermined interval; a first transparent electrode arranged on the first auxiliary electrodes; a second transparent electrode arranged on the second auxiliary electrodes; and an electrochromic layer arranged between the first transparent electrode and the second transparent electrode.

In another aspect of the present invention, a transparent display device according to an embodiment of the present invention comprises a transparent display panel that includes transmissive areas and emission areas, and a light controlling device arranged on at least one surface of the transparent display panel. The light controlling device comprises a first base film and a second base film; first auxiliary electrodes arranged on one surface of the first base film facing the second base film, and patterned at a predetermined interval; second auxiliary electrodes arranged on one surface of the second base film facing the first base film, and patterned at a predetermined interval; a first transparent electrode arranged on the first auxiliary electrodes; a second transparent electrode arranged on the second auxiliary electrodes; and an electrochromic layer arranged between the first transparent electrode and the second transparent electrode.

In other aspect of the present invention, a method for manufacturing a light controlling device according to an embodiment of the present invention comprises patterning first auxiliary electrodes on a first base film at a predetermined interval and patterning second auxiliary electrodes on a second base film at a predetermined interval; forming a first transparent electrode on the first auxiliary electrodes and forming a second transparent electrode on the second auxiliary electrodes; forming a counter layer on the first transparent electrode and forming an electrochromic layer on the second transparent electrode; and depositing a liquid electrolyte on the counter layer and arranging the electrochromic layer on the liquid electrolyte and then bonding the first base film and the second base film to each other by hardening the liquid electrolyte.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Terms disclosed in this specification should be understood as follows.

The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements.

Hereinafter, a light controlling device, a transparent display device including the same and a method for manufacturing the same according to the present invention will be described in detail with reference to the accompanying drawings. Wherever possible, the same reference numbers will be used throughout the drawings to refer to the same or like parts. Also, in the following description of the present invention, if detailed description of elements or functions known in respect of the present invention is determined to make the subject matter of the present invention unnecessarily obscure, the detailed description will be omitted or may be brief.

Figure 1:
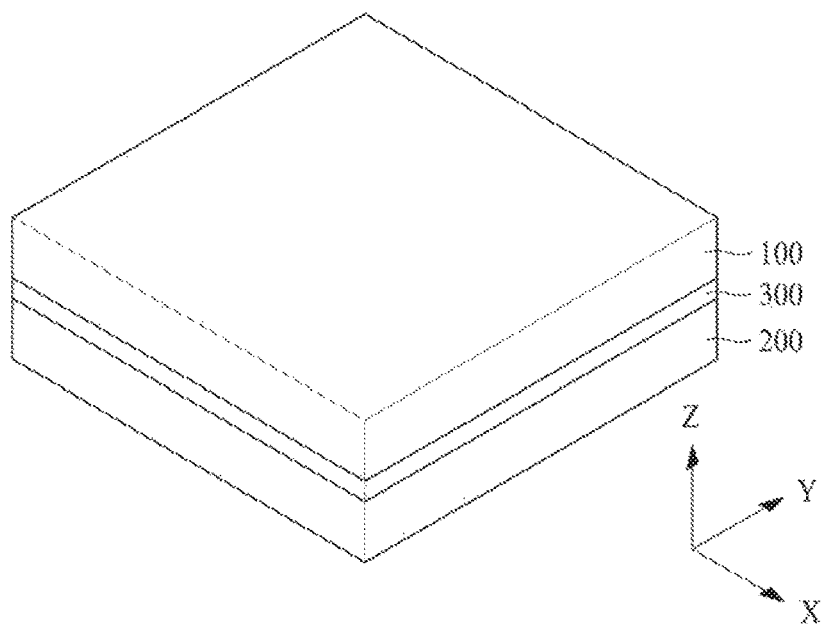
FIG. 1 is a perspective view illustrating a light controlling device of a transparent display device according to an embodiment of the present invention.
Figure 2:
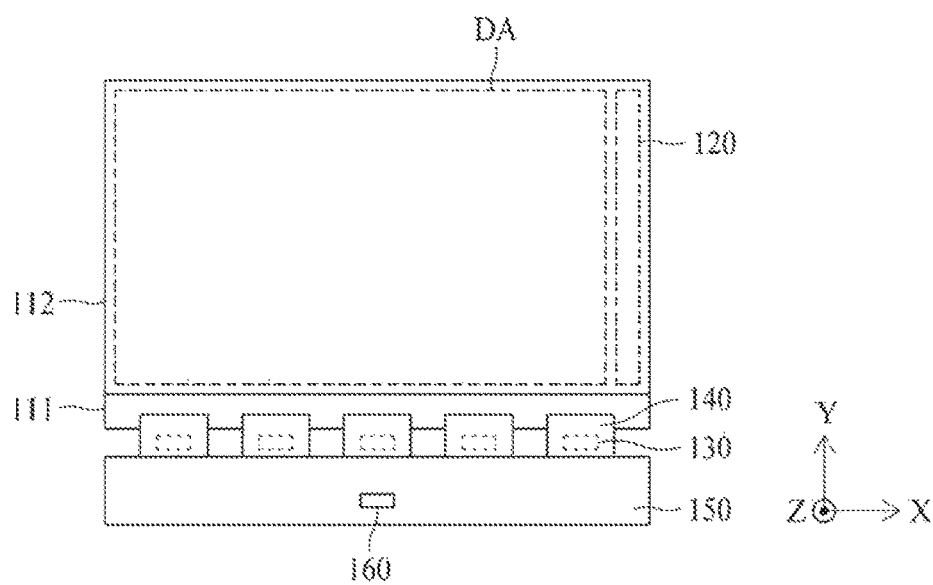
FIG. 2 is a plane view illustrating a transparent display panel, a gate driver, a source drive IC, a flexible film, a circuit board and a timing controller of the transparent display device according to the embodiment of the present invention.
Figure 3:
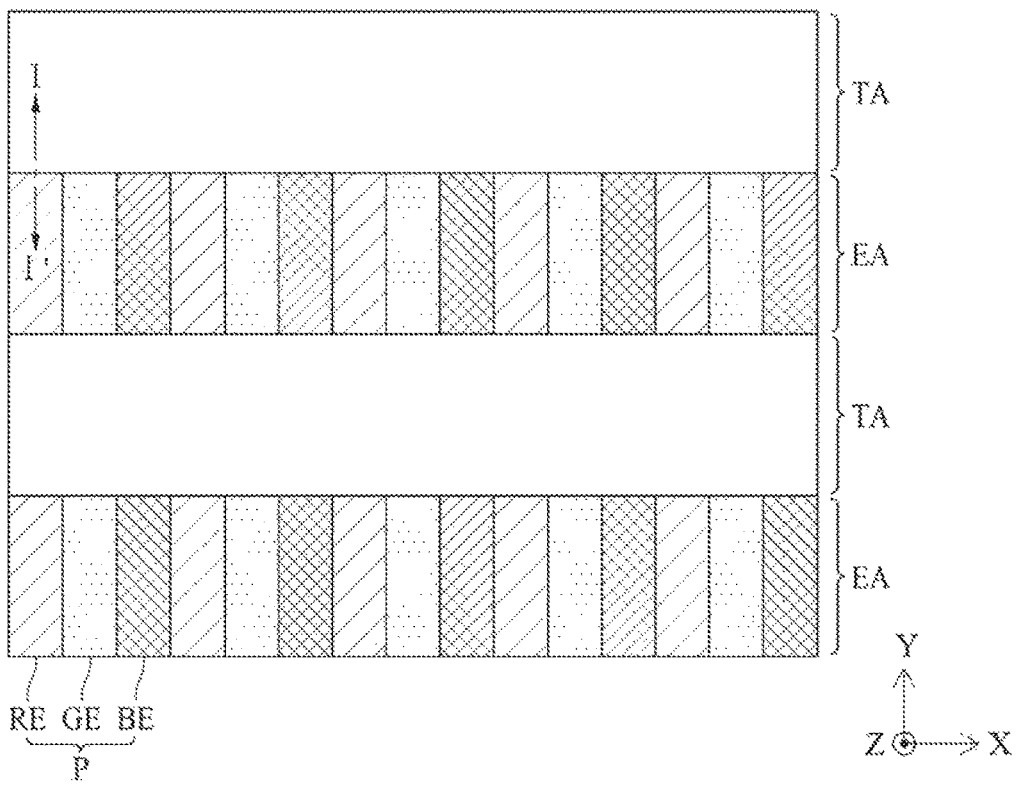
FIG. 3 is an exemplary view illustrating a pixel of a display area of FIG. 2.
Figure 4:
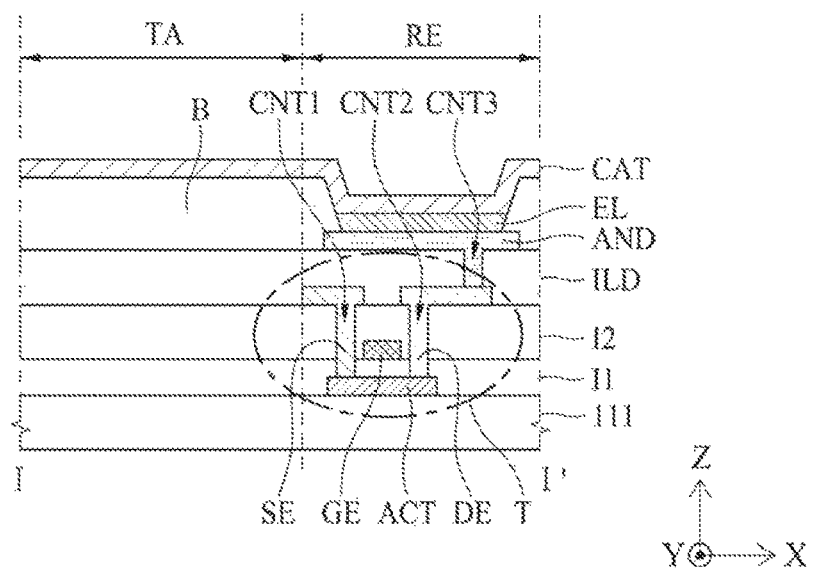
FIG. 4 is a cross-sectional view taken along line I-I' of FIG. 3.

FIG. 1 is a perspective view illustrating a light controlling device of a transparent display device according to an embodiment of the present invention. FIG. 2 is a plane view illustrating a transparent display panel, a gate driver, a source drive IC, a flexible film, a circuit board and a timing controller of the transparent display device according to the embodiment of the present invention. FIG. 3 is an exemplary view illustrating a pixel of a display area of FIG. 2. FIG. 4 is a cross-sectional view taken along line I-I' of FIG. 3. All the components of the transparent display device according to all embodiments of the present invention are operatively coupled and configured.

Hereinafter, the transparent display device according to the embodiment of the present invention will be described in detail with reference to FIGS. 1 to 4.

Referring to FIGS. 1 to 4, a transparent display device according to the embodiment of the present invention includes a transparent display panel 100, a gate driver 120, a source drive integrated circuit (hereinafter, referred to as "IC") 130, a flexible film 140, a circuit board 150, a timing controller 160, a light controlling device 200, and an adhesive layer 300.

Although the transparent display device according to the embodiment of the present invention has been described based on an organic light emitting display device, the transparent display device may be realized as a liquid crystal display device or an electrophoresis display device.

The transparent display panel 100 includes a lower substrate 111 and an upper substrate 112. The upper substrate 112 may be an encapsulation substrate. The lower substrate 111 is formed to be greater than the upper substrate 112, whereby the lower substrate 111 may partially be exposed without being covered by the upper substrate 112.

Gate lines, data lines, pixels arranged in crossing areas of the gate lines and the data lines are formed in a display area DA of the transparent display panel 100. The pixels of the display area DA may display an image.

The display area DA includes transmissive areas TA and emission areas EA as shown in FIG. 3. The transparent display panel 100 may allow a user to view an object or background disposed on a rear surface of the transparent display panel 100 due to the transmissive areas TA, and may display images due to the emission areas. The transmissive areas TA and the emission areas EA are formed longitudinally along the gate lines (X-axis direction) in FIG. 3, but are not limited to FIG. 3. That is, the transmissive areas TA and the emission areas EA may be formed longitudinally along the data lines (Y-axis direction).

The transmissive area TA is an area that transmits incident light as it is. The emission area EA is an area that emits light. The emission area EA may include a plurality of pixels P, each of which includes a red emission portion RE, a green emission portion GE, and a blue emission portion BE as shown in FIG. 3, but is not limited to FIG. 3. For example, each of the pixels P may further include a white emission portion in addition to the red emission portion RE, the green emission portion GE and the blue emission BE portion. Alternatively, each of the pixels P may include at least two emission portions of a red emission portion RE, a green emission portion GE, a blue emission portion BE, a yellow emission portion, a magenta emission portion, and a cyan emission portion.

The red emission portion RE is an area that emits red light, the green emission portion GE is an area that emits green light, and the blue emission portion BE is an area that emits blue light. The red emission portion RE, the green emission portion GE and the blue emission portion BE of the emission area EA correspond to non-transmissive areas that emit predetermined light and do not transmit incident light.

A transistor T, an anode electrode AND, an organic layer EL, and a cathode electrode CAT may be provided at each of the red emission portion RE, the green emission portion GE and the blue emission portion BE.

The transistor T includes an active layer ACT provided on the lower substrate 111, a first insulating film I1 provided on the active layer ACT, a gate electrode GE provided on the first insulating film I1, a second insulating film I2 provided on the gate electrode GE, and source and drain electrodes SE and DE provided on the second insulating film I2 and connected to the active layer ACT through first and second contact holes CNT1 and CNT2. Although the transistor T is formed in a top gate type in FIG. 4, the transistor T may be formed in a bottom gate type without limitation to the top gate type.

The anode electrode AND is connected to the drain electrode DE of the transistor T through a third contact hole CNT3 that passes through an inter layer dielectric ILD provided on the source and drain electrodes SE and DE. A bank B is provided between the anode electrodes AND adjacent to each other, whereby the anode electrodes AND adjacent to each other may electrically be insulated from each other.

The organic layer EL is provided on the anode electrode AND. The organic layer EL may include a hole transporting layer, an organic light emitting layer, and an electrode transporting layer. The cathode electrode CAT is provided on the organic layer EL and the bank B. If a voltage is applied to the anode electrode AND and the cathode electrode CAT, holes and electrons are respectively moved to the organic light emitting layer through the hole transporting layer and the electron transporting layer and combined with each other in the organic light emitting layer to emit light.

Although the transparent display panel 100 is formed in a front top emission type in FIG. 4, the transparent display panel 100 may be formed in a rear bottom emission type without limitation to the front top emission type. In front the top emission type, since light of the organic layer EL is emitted toward the upper substrate 112, the transistor T may be provided in a wide range below the bank B and the anode electrode AND. Therefore, the front top emission type has an advantage in that a design area of the transistor T is wider than that of the rear bottom emission type. Also, in the front top emission type, the anode electrode AND may be formed of a metal material having high reflexibility such as aluminum and a deposition structure of aluminum and ITO, and the cathode electrode CAT may be formed of, but not limited to, a transparent metal material such as ITO and IZO. The cathode electrode CAT may be any one of Ag, Ti, Al, Mo, or an alloy of Ag and Mg, which is thinly formed at a thickness of several hundreds of Å or less. In this case, the cathode electrode CAT may be a semi-transmissive layer, and therefore may be used as a substantially transparent cathode.

As described above, each of the pixels P of the transparent display device according to the embodiment of the present invention includes the transmissive areas TA that transmit incident light as it is, and emission areas EA that emit light. As a result, according to the embodiment of the present invention, a user may view an object or background disposed on the rear surface of the transparent display device through the transmissive areas TA of the transparent display device.

The gate driver 120 supplies gate signals to the gate lines in accordance with a gate control signal input from the timing controller 160. In FIG. 2, the gate driver 120 is formed, but not limited to, outside one side of the display area DA of the transparent display panel 100 in a gate driver in panel (GIP) mode. That is, the gate driver 120 may be formed outside both sides of the display area DA of the transparent display panel 100 in a GIP mode, or may be fabricated of a driving chip, packaged in a flexible film and attached to the transparent display panel 100 in a tape automated bonding (TAB) mode.

The source drive IC 130 receives digital video data and a source control signal from the timing controller 160. The source drive IC 130 converts the digital video data to analog data voltages in accordance with the source control signal and supplies the analog data voltages to the data lines. If the source drive IC 130 is fabricated of a driving chip, the source drive IC may be packaged in the flexible film 140 in a chip on film (COF) or chip on plastic (COP) mode.

Since the lower substrate 111 is greater than the upper substrate 112, the lower substrate 111 may partially be exposed without being covered by the upper substrate 112. Pads such as data pads are provided in the lower substrate 111 which is exposed without being covered by the upper substrate 112.

Lines which connect the pads with the source drive IC 130 and lines which connect the pads with lines of the circuit board 150 may be formed in the flexible film 140. An anisotropic conducting film may be used as the flexible film 140, and is attached onto the pads, whereby the pads may be connected with the lines of the flexible film 140.

The circuit board 150 may be attached to the flexible films 140. A plurality of circuits comprised of driving chips may be packaged in the circuit board 150. For example, the timing controller 160 may be packaged in the circuit board 150. The circuit board 150 may be a printed circuit board or a flexible printed circuit board.

The timing controller 160 receives digital video data and a timing signal from an external system board. The timing controller 160 generates a gate control signal for controlling an operation timing of the gate driver 200 and a source control signal for controlling the source drive ICs 130 on the basis of the timing signal. The timing controller 160 supplies the gate control signal to the gate driver 120, and supplies the source control signal to the source drive ICs 130.

The light controlling device 200 may shield incident light in a light-shielding mode and transmit incident light in a transmissive mode. The light controlling device 200 according to the embodiment of the present invention may be an electrochromic device. Therefore, the light controlling device 200 according to the embodiment of the present invention is advantageous that a transmissve mode may be switched to a light-shielding mode at a low driving voltage or vice versa. Also, since a voltage has to be applied only during mode switching from the transmissive mode to the light-shielding mode or vice versa in the light controlling device 200, it is advantageous that a voltage is not required to be continuously applied to maintain the transmissive mode or the light-shielding mode. A detailed description of the light controlling device 200 according to the embodiment of the present invention will be made later with reference to FIGS. 5 and 6.

The adhesive layer 300 bonds the transparent display panel 100 to the light controlling device 200. The adhesive layer 300 may be a transparent adhesive film such as an optically clear adhesive (OCA) or a transparent adhesive such as an optically clear resin (OCR). In this case, the adhesive layer 300 may have a refractive index between 1.4 and 1.9 for refractive index matching between the transparent display panel 100 and the light controlling device 200.

Figure 5:
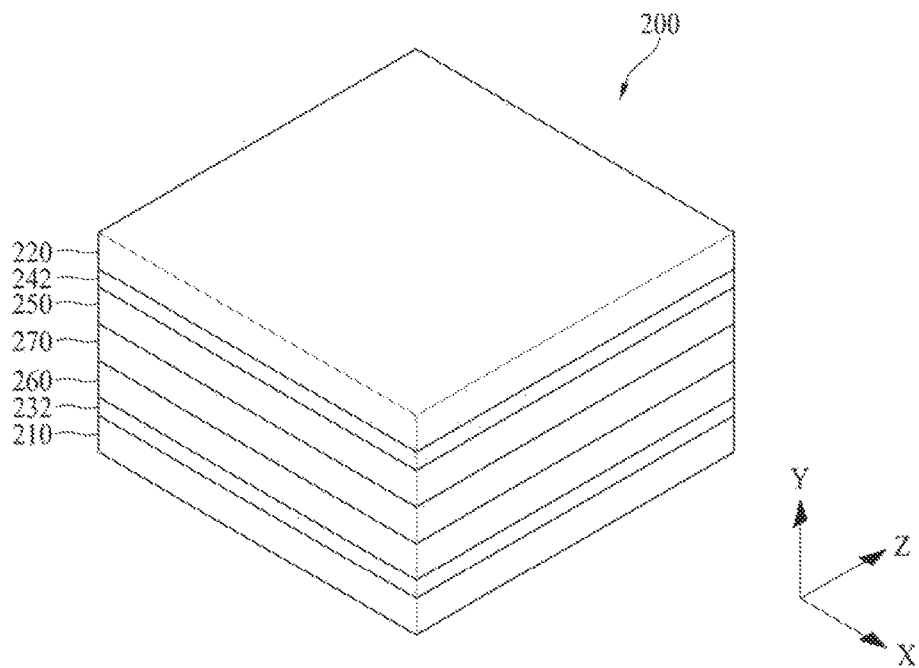
FIG. 5 is a perspective view illustrating a light controlling device according to a first embodiment of the present invention.
Figure 6:
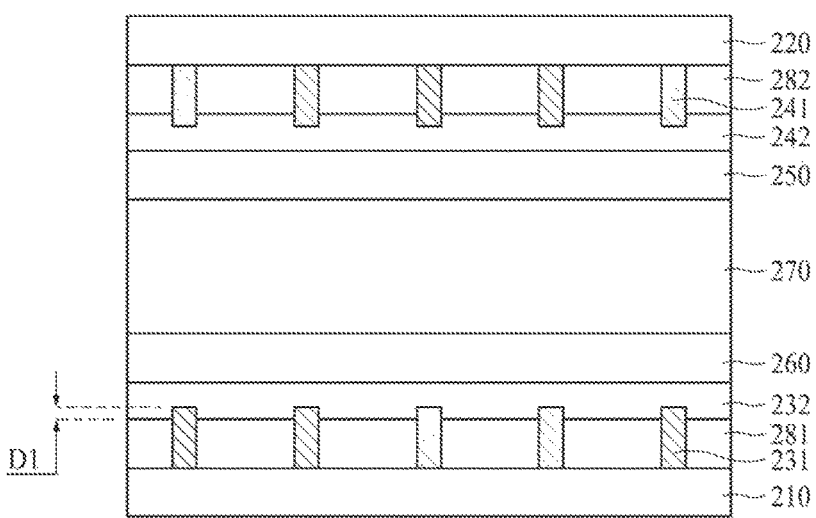
FIG. 6 is a cross-sectional view illustrating one side section of the light controlling device according to the first embodiment of the present invention.

FIG. 5 is a perspective view illustrating a light controlling device according to a first embodiment of the present invention. FIG. 6 is a cross-sectional view illustrating one side section of the light controlling device according to the first embodiment of the present invention.

Hereinafter, the light controlling device according to the first embodiment of the present invention will be described in detail with reference to FIGS. 5 and 6.

Referring to FIGS. 5 and 6, the light controlling device 200 according to the first embodiment of the present invention includes a first base film 210, a second base film 220, first auxiliary electrodes 231, second auxiliary electrode 241, a first insulating film 281, a second insulating film 282, a first transparent electrode 232, a second transparent electrode 242, an electrochromic layer 250, a counter layer 260, and an electrolytic layer 270.

The first base film 210 and the second base film 220 are arranged to face each other. For example, each of the first base film 210 and the second base film 220 may be, but not limited to, a sheet or film that includes cellulose resin such as TAC (triacetyl cellulose) or DAC (diacetyl cellulose), COP (cyclic olefin polymer) such as norbornene derivatives, COC (cyclo olefin copolymer), acryl resin such as and PMMA (poly(methylmethacrylate)), polyolefin such as PC (polycarbonate), PE (polyethylene) or PP (polypropylene), polyester such as PVA (polyvinyl alcohol), PES (poly ether sulfone), PEEK (polyetheretherketone), PEI (polyetherimide), PEN (polyethylenenaphthalate), and PET (polyethyleneterephthalate), PI (polyimide), PSF (polysulfone), or fluoride resin.

The first auxiliary electrodes 231b are provided on one surface of the first base film 210 facing the second base film 220. The first auxiliary electrodes 231b are electrically connected with the first transparent electrode 232 and reduces resistance of the first transparent electrode 232. The first auxiliary electrodes 231b are patterned on one surface of the first base film 210 at a predetermined interval. The respective first auxiliary electrodes 231b are spaced apart from each other at a predetermined interval. In this case, the first auxiliary electrode 231b may be thicker than the first transparent electrode 232. The first auxiliary electrode 231b may have a thickness in the range of 1 μm to 2 μm.

The second auxiliary electrodes 241 are provided on one surface of the second base film 220 facing the first base film 210. The second auxiliary electrodes 241 are electrically connected with the second transparent electrode 242 and reduces resistance of the second transparent electrode 242. The second auxiliary electrodes 241 are patterned on one surface of the second base film 220 at a predetermined interval. The respective second auxiliary electrodes 241 are spaced apart from each other at a predetermined interval. In this case, the second auxiliary electrode 241 may be thicker than the second transparent electrode 242. The second auxiliary electrode 241 may have a thickness in the range of 1 μm to 2 μm. For example, each of the first auxiliary electrode 231b and the second auxiliary electrode 241 may be, but not limited to, an opaque metal material such as Cu or Al.

The first and second auxiliary electrodes 231b and 241 may be arranged to correspond to a transmissive area and an emission area of the transparent display device. For example, if each of the first and second auxiliary electrodes 231b and 241 is arranged to correspond to each of the transmissive areas of the transparent display device, since each of the first and second auxiliary electrodes 231b and 241 is formed of an opaque metal material, a width of the first and second auxiliary electrodes 231b and 241 is preferably formed within the range that is not perceived by the naked eye. Therefore, the width of the first and second auxiliary electrodes 231b and 241 may be in the range of 0.1 μm to 10 μm. For example, if the first and second auxiliary electrodes 231b and 241 are provided in the emission area of the transparent display panel, the width of the first and second auxiliary electrodes 231b and 241 may be the same as or narrower than that of the emission area. However, it is preferable that the width of the first and second auxiliary electrodes 231b and 241 is formed to be narrower than that of the emission area to more easily align the emission areas of the first and second auxiliary electrodes 231b and 241 and the transparent display panel. Arrangement relation of the transmissive area or the emission area and the first and second auxiliary electrodes 231 and 241 will be describe later with reference to FIG. 9.

The first insulating film 281 is provided between the first auxiliary electrodes 231. The first insulating film 281 is provided on the first base film 210 arranged between the first auxiliary electrodes 231. In this case, the first insulating film 281 may have a thickness which is the same as or thinner than that of the first auxiliary electrode 231. Therefore, the upper portion of the first auxiliary electrodes 231*b* are exposed by being covered with the first insulating film 281. The first transparent electrode 232 is provided on the exposed upper portion of the first auxiliary electrodes 231. The upper portion of the first auxiliary electrodes 231*b* is in contact with the first transparent electrode 232.

The second insulating film 282 is provided between the second auxiliary electrodes 241. The second insulating film 282 is provided on the second base film 220 arranged between the second auxiliary electrodes 241. In this case, the second insulating film 282 may have a thickness which is the same as or thinner than that of the second auxiliary electrode 241. Therefore, the upper portion of the second auxiliary electrodes 241 is exposed by being covered by the second insulating film 282. The second transparent electrode 242 is provided on the exposed upper portion of the second auxiliary electrodes 241. The upper portion of the second auxiliary electrodes 241 is in contact with the second transparent electrode 242. For example, each of the first insulating film 281 and the second insulating film 282 may be made of, but not limited to, acryl resin, epoxy resin, phenolic resin, polyamides resin, or polyimide resin.

For example, if the first insulating film 281 is not provided between the first auxiliary electrodes 231, the first transparent electrode 232 may be provided on the first base film 210 arranged between the first auxiliary electrodes 231. In this case, a crack may occur in the first transparent electrode 232 at sides of the first auxiliary electrodes due to each thickness of the first auxiliary electrodes 231. Also, since the first auxiliary electrode 231*b* has a thickness thicker than its width, if the first auxiliary electrode 231*b* is formed on the first base film 210 which is flexible, there is difficulty in maintaining the shape of the first auxiliary electrode 231.

However, according to the first embodiment of the present invention, since the first insulating film 281 is provided between the first auxiliary electrodes 231, a distance D1 from the upper surface of the first auxiliary electrodes 231, which are in contact with the first transparent electrode 232, to the upper surface of the first insulating film 281 may be reduced. That is, in the first embodiment of the present invention, the first insulating film 281 is formed between the first auxiliary electrodes 231, and the first transparent electrode is formed on the first auxiliary electrodes 231*b* and the first insulating film 281. For this reason, since the first transparent electrode 232 may be formed with planarization in the embodiment of the present invention, a crack may be prevented from occurring in the first transparent electrode 232 at the sides of the first auxiliary electrodes 231*b* due to the thickness of each of the first auxiliary electrodes 231. Also, if the first auxiliary electrode 231*b* having a thickness thicker than its width is formed on the first base film 210 which is flexible, since the first insulating film 281 supports the first auxiliary electrode 231, the shape of the first auxiliary electrode 231*b* may be maintained.

The first transparent electrode 232 is provided on the first auxiliary electrodes 231. The first transparent electrode 232 is in contact with the first auxiliary electrodes 231*b* and the first insulating films 281 arranged between the first auxiliary electrodes 231. In this case, the first transparent electrode 232 has a thickness thinner than that of each of the first auxiliary electrodes 231.

The second transparent electrode 242 is provided on the second auxiliary electrodes 241. The second transparent electrode 242 is in contact with the second auxiliary electrodes 241 and the second insulating films 282 arranged between the second auxiliary electrodes 241. In this case, the second transparent electrode 242 has a thickness thinner than that of each of the second auxiliary electrodes 241.

For example, each of the first transparent electrode 232 and the second transparent electrode 242 may be, but not limited to, silver oxide (e.g.; AgO or $Ag_2O$ or $Ag_2O_3$), aluminum oxide (e.g.; $Al_2O_3$), tungsten oxide (e.g.; $WO_2$ or $WO_3$ or $W_2O_3$), magnesium oxide (e.g.; MgO), molybdenum (e.g.; $MoO_3$), zinc oxide (e.g.; ZnO), tin oxide (e.g.; $SnO_2$), indium oxide (e.g.; $In_2O_3$), chrome oxide (e.g.; $CrO_3$ or $Cr_2O_3$), antimony oxide (e.g.; $Sb_2O_3$ or $Sb_2O_5$), titanium oxide (e.g; $TiO_2$), nickel oxide (e.g.; NiO), copper oxide (e.g; CuO or $Cu_2O$), vanadium oxide (e.g.; $V_2O_3$ or $V_2O_5$), cobalt oxide (e.g.; CoO), iron oxide (e.g; $Fe_2O_3$ or $Fe_3O_4$), niobium oxide (e.g; $Nb_2O_5$), Indium Tin Oxide (ITO), Indium Zinc Oxide (IZO), Aluminum doped Zinc Oxide (ZAO), Aluminum Tin Oxide (TAO) or Antimony Tin Oxide (ATO).

In the first embodiment of the present invention, the first auxiliary electrode 231*b* electrically connected with the first transparent electrode 232 is provided between the first transparent electrode 232 and the first base film 210, and the second auxiliary electrode 241 electrically connected with the second transparent electrode 242 is provided between the second transparent electrode 242 and the second base film 220. Therefore, surface resistance of the first and second transparent electrodes 232 and 242 may be reduced as compared with the related art in which the first and second transparent electrodes 232 and 242 are only provided. Therefore, in the first embodiment of the present invention, the time required for mode switching from the transmissive mode to the light-shielding mode or from the light-shielding mode to the transmissive mode may be reduced.

If a voltage is applied to each of the first transparent electrode 232 and the second transparent electrode 242, the electrochromic layer 250, the counter layer 260 and the electrolytic layer 270 are subjected to an electrochemical oxidation-reduction reaction, whereby a color of the electrochromic layer 250 is changed.

For example, if a negative voltage is applied to the first transparent electrode 232 and a positive voltage is applied to the second transparent electrode 242, a reduction reaction occurs in the electrochromic layer 250, and an oxidation reaction occurs in the counter layer 260. Since the electrochromic layer 250 is changed to a predetermined color such as block by the reduction reaction, the electrochromic layer 250 may shield incident light. That is, the light controlling device 200 may realize a light-shielding mode for shielding incident light.

Also, if a positive voltage is applied to the first transparent electrode 232 and a negative voltage is applied to the second transparent electrode 242, an oxidation reaction occurs in the electrochromic layer 250, and a reduction reaction occurs in the counter layer 260. Since the electrochromic layer 250 is changed to a transparent color by the oxidation reaction, the electrochromic layer 250 may transmit incident light as it is. That is, the light controlling device 200 may realize a transmissive mode for transmitting incident light.

The electrochromic layer 250 is arranged between the first transparent electrode 232 and the second transparent electrode 242. The electrochromic layer 250 may include a core material such as Transparent Conductive Oxides (TCO) and an electrochromic material mixed with the core material. The core material may be $TiO_2$, $In_2O_3$, $SnO_2$, $RuO_2$, or a material obtained by surface-treating ITO with $TiO_2$. The electrochromic material has a predetermined color by absorbing the predetermined color if a reduction reaction occurs, and may be a material which is changed to a transparent color if an oxidation reaction occurs. For example, the electrochromic material may be 1,1'-dibenzyl-4,4'-bipyridinium bistetrafluorborate. It is preferable that the core material is mixed with electrochromic materials having various colors through a reduction reaction to enhance a light-shielding function.

The counter layer 260 is provided on the first transparent electrode 232. The counter layer 260 corresponds to an assistance layer that allows the electrochromic layer 250 to be smoothly subjected to an oxidation-reduction reaction. The counter layer 260 may include a counter material that has a predetermined color by absorbing the predetermined color if an oxidation reaction occurs and is changed to a transparent color by a reduction reaction. The counter material may be TMPD (N,N,N',N'-tetramethyl-1,4-phenylenediamine), TMB (3,3',5,5'-Tetramethylbenzidine), NTMB (N,N,N',N'-Tetramethylbenzidine) or DAB (3,3'-Diaminobenzidine). The counter layer 260 may be omitted.

The electrolytic layer 270 may include an electrolyte, a polymer and a UV initiator. The electrolyte may be lithium perchlorate, t-butylammoinum perchlorate, t-butylammoinum-t-fluoroborate, or tetrabutylammonium trifluoromethanesulfonate. The polymer may be acrylate based polymer, polyester based polymer, or epoxy based polymer. The UV initiator may be benzoin ether based UV initiator or amine based UV initiator. The electrolytic layer 270 may be formed by depositing a liquid state material having viscosity and then UV hardening the liquid state material. The electrolytic layer 270 provides positive ions and negative ions to allow the electrochromic layer 250 and the counter layer 260 to be subjected to an oxidation-reduction reaction.

Figure 7:
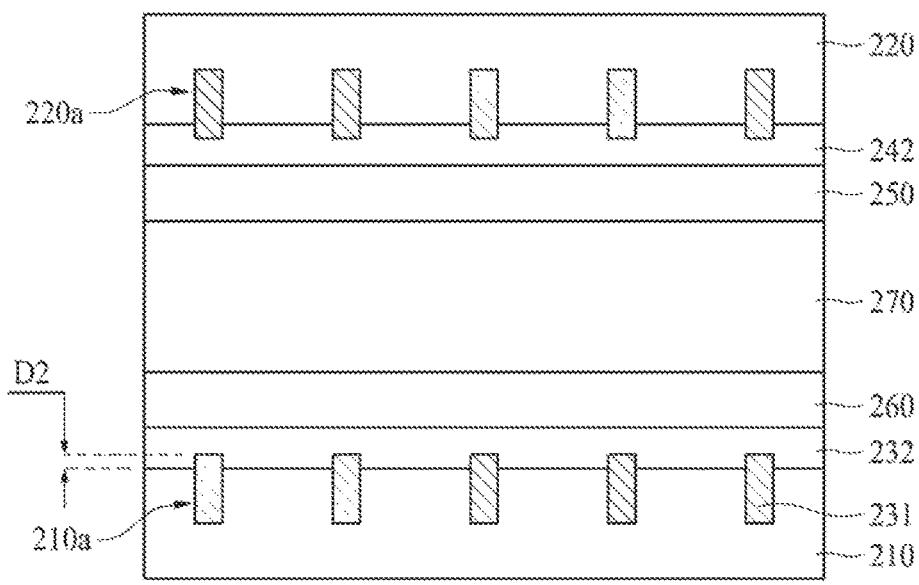
FIG. 7 is a cross-sectional view illustrating one side section of a light controlling device according to a second embodiment of the present invention.

FIG. 7 is a cross-sectional view illustrating one side section of a light controlling device according to a second embodiment of the present invention. The light controlling device according to the second embodiment of the present invention is generally the same as the light controlling device according to the first embodiment of the present invention, except that the first auxiliary electrode is inserted into one surface of the first base film, the second auxiliary electrode is inserted into one surface of the second base film, and the first insulating film and the second insulating film are not provided. Therefore, the same reference numbers will be used throughout the drawings to refer to the same or like parts, and repeated description of a material and structure of each element will be omitted or may be brief.

Referring to FIG. 7, the first base film 210 according to the second embodiment of the present invention includes first insertion holes 210a which are engraved. The first insertion holes 210a are provided on one surface of the first base film 210 that faces the second base film 220. Each of the first auxiliary electrodes 231b is inserted into each of the first insertion holes 210a. The first transparent electrode 232 is arranged on one surface of the first base film 210 and on the first auxiliary electrodes 231.

Also, the second base film 220 according to the second embodiment of the present invention includes second insertion holes 220a which are engraved. The second insertion holes 220a are provided on one surface of the second base film 220 that faces the first base film 210. Each of the second auxiliary electrodes 241 is inserted into each of the second insertion holes 220a. The second transparent electrode 242 is arranged on one surface of the second base film 220 and on the second auxiliary electrodes 241.

In the second embodiment of the present invention, since the first auxiliary electrodes 231b inserted into the first base film 210 are electrically connected with the first transparent electrode 232 and the second auxiliary electrodes 241 inserted into the second base film 220 are electrically connected with the second transparent electrode 242, surface resistance of the first and second transparent electrodes 232 and 242 may be reduced as compared with the related art in which the first and second transparent electrodes 232 and 242 are only provided. Therefore, in the second embodiment of the present invention, the time required for mode switching from the transmissive mode to the light-shielding mode or from the light-shielding mode to the transmissive mode may be reduced.

Also, according to the second embodiment of the present invention, since the first auxiliary electrodes 231b are inserted into the first base film 210, a distance D2 from the upper surface of the first auxiliary electrodes 231, which are in contact with the first transparent electrode 232, to the upper surface of the first base film 210 may be reduced. That is, in the second embodiment of the present invention, since the first auxiliary electrodes 231 are inserted into the first base film 210, the first transparent electrode 232 may be formed with planarization. Therefore, in the second embodiment of the present invention, a crack may be prevented from occurring in the first transparent electrode 232 at the sides of the first auxiliary electrodes 231b due to the thickness of each of the first auxiliary electrodes 231. Also, since the first auxiliary electrodes 231b are inserted into the first base film 210, the shape of the first auxiliary electrode 231b having a thickness thicker than its width may be maintained.

Figure 8:
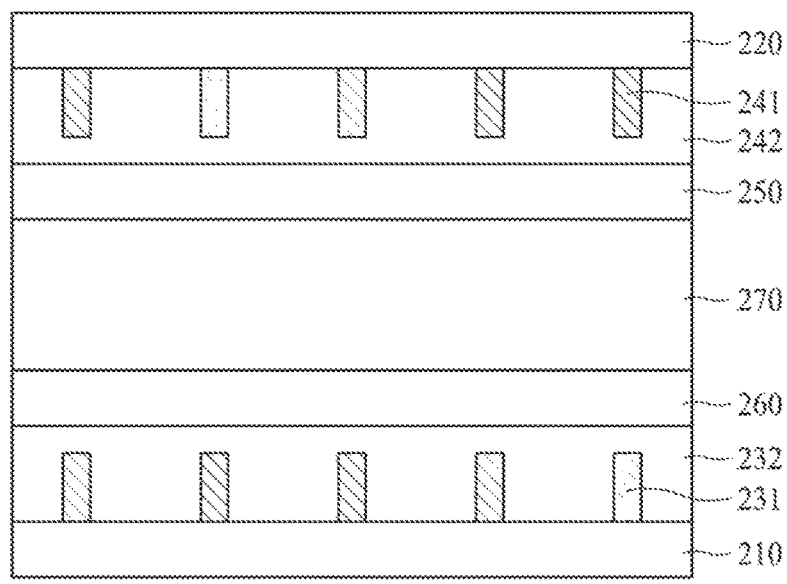
FIG. 8 is a cross-sectional view illustrating one side section of a light controlling device according to a third embodiment of the present invention.

FIG. 8 is a cross-sectional view illustrating one side section of a light controlling device according to a third embodiment of the present invention. The light controlling device according to the third embodiment of the present invention is generally the same as the light controlling device according to the first embodiment of the present invention, except that first and second transparent electrodes are thicker than the first and second auxiliary electrodes, and a first insulating film and a second insulating film are not provided. Therefore, the same reference numbers will be used throughout the drawings to refer to the same or like parts, and repeated description of a material and structure of each element will be omitted or may be brief.

Referring to FIG. 8, the first transparent electrode 232 according to the third embodiment of the present invention is provided on the first auxiliary electrodes 231. In this case, the first transparent electrode 232 may be thicker than the first auxiliary electrodes 231. The second transparent electrode 242 is provided on the second auxiliary electrodes 241. In this case, the second transparent electrode 242 may be thicker than the second auxiliary electrodes 241.

In the third embodiment of the present invention, since the first auxiliary electrodes 231b provided on the first base film 210 are electrically connected with the first transparent electrode 232 and the second auxiliary electrodes 241 provided on the second base film 220 are electrically connected with the second transparent electrode 242, surface resistance of the first and second transparent electrodes 232 and 242 may be reduced as compared with the related art in which the first and second transparent electrodes 232 and 242 are only provided.

For example, in the case that the first auxiliary electrodes 231b are provided on the transmissive area TA, transmittance of the transparent display device may be reduced if the width of the first auxiliary electrodes 231b exceeds 10 µm.

Therefore, the width of each of the first auxiliary electrodes 231b may be set in the range of 0.1 μm to 10 μm. In this case, the thickness of the first auxiliary electrode 231b may be increased to reduce surface resistance of the first transparent electrode 232 connected with the first auxiliary electrodes 231. If the first transparent electrode 232 is thinner than the first auxiliary electrodes 231, a step difference may occur between the first transparent electrode 232 provided on the first auxiliary electrodes 231b and the first transparent electrode 232 provided on the first base film 210. In this case, it may be difficult to uniformly deposit the first transparent electrode 232, and a crack may occur on the surface of the first transparent electrode 232. To prevent this problem from occurring, the first transparent electrode 232 is formed to be thicker than the first auxiliary electrodes 231b in the third embodiment of the present invention. Therefore, the surface of the first transparent electrode 232 may be formed uniformly, and the thickness of the first transparent electrode 232 may be increased, whereby surface resistance may additionally be reduced.

Figure 9:
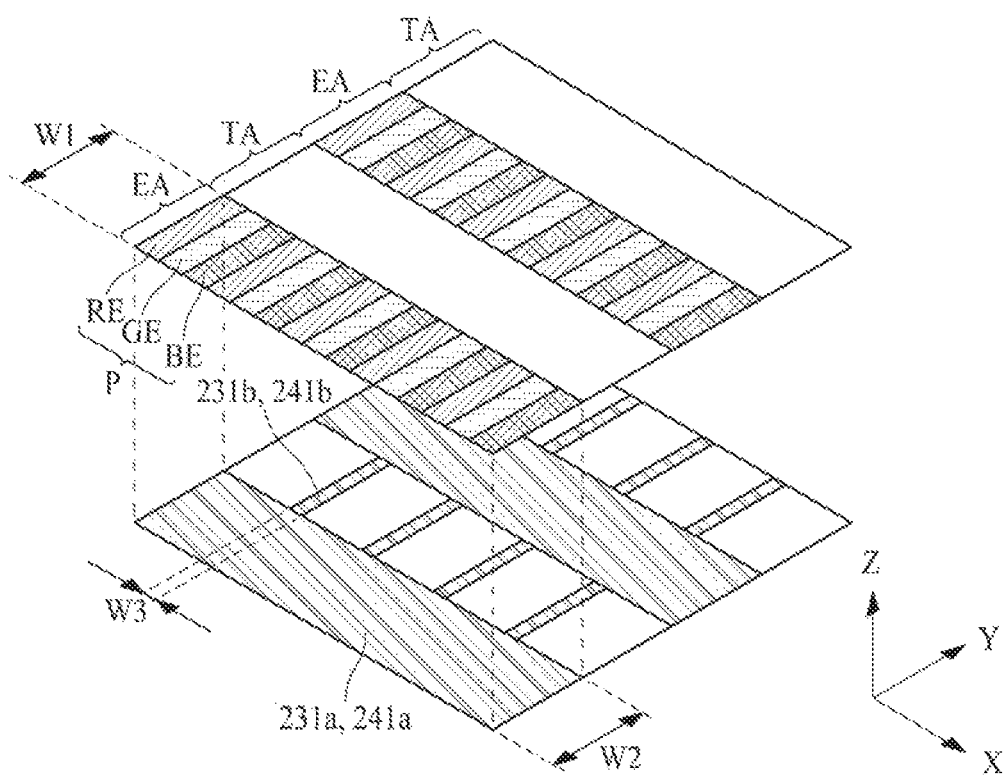
FIG. 9 is an exemplary view illustrating an arrangement relation of first auxiliary electrodes and a display area of a transparent display panel in accordance with the light controlling device according to the first embodiment of the present invention.

FIG. 9 is an exemplary view illustrating an arrangement relation of first auxiliary electrodes and a display area of a transparent display panel in accordance with the light controlling device according to the first embodiment of the present invention.

Referring to FIG. 9, each of the first auxiliary electrodes 231b according to the first embodiment of the present invention includes first auxiliary lines 231a arranged along a first direction (X-axis direction) and second auxiliary lines 231b arranged along a second direction (Y-axis direction) crossing the first direction (X-axis direction). In this case, the first auxiliary lines 231a are arranged to correspond to the emission area EA of the display area DA. A width W2 of the first auxiliary lines 231a according to the embodiment of the present invention may be the same as or narrower than the width W1 of the emission area EA. However, if the width W2 of the first auxiliary lines 231a is the same as the width W1 of the emission area EA, a problem occurs in that it is difficult to align the first auxiliary lines 231a and the emission areas EA. Therefore, an area where light is not controlled by the light controlling device 200 may correspond to the transmissive area TA of the transparent display panel. In this case, light leakage may occur in the transmissive area TA of the transparent display panel in the light-shielding mode. Therefore, it is preferable that the width W2 of the first auxiliary lines 231a is narrower than the width W1 of the emission area EA. Therefore, the problem of light leakage occurring in the transmissive area TA of the transparent display panel due to the area where light is not controlled by the light controlling device may be avoided.

The second auxiliary lines 231b are arranged in the transmissive area TA of the display area DA. In this case, a width W3 of the second auxiliary line 231b is narrower than the width W2 of the first auxiliary line 231a. If the second auxiliary lines 231b are arranged to correspond to each of the transmissive areas TA of the transparent display device, since the second auxiliary lines 231b are formed of an opaque metal material, it is preferable that the width of the second auxiliary line 231b is formed within the range that is not perceived by the naked eye. Therefore, the width W3 of the second auxiliary line 231b may be in the range of 0.1 μm to 10 μm. That is, if the width W3 of the second auxiliary line 231b is in the range of 0.1 μm to 10 μm, transmittance may not be reduced in the transmissive mode of the light controlling device and at the same time surface resistance of the first transparent electrode 232 may be reduced.

Each of the second auxiliary electrodes 241 according to the embodiment of the present invention includes third auxiliary lines 241a arranged along a first direction (X-axis direction) and fourth auxiliary lines 241b arranged along a second direction (Y-axis direction) crossing the first direction (X-axis direction). The third auxiliary lines 241a are arranged to correspond to the first auxiliary lines 231a, whereby surface resistance of the second transparent electrode 240 is reduced. The fourth auxiliary lines 241b are arranged to correspond to the second auxiliary lines 231b, whereby surface resistance of the second transparent electrode 240 is reduced.

In short, in the embodiment of the present invention, the first and third auxiliary lines 231a and 241a arranged along the first direction (X-axis direction) and the second and fourth auxiliary lines 231b and 241b arranged along the second direction (Y-axis direction) crossing the first direction (X-axis direction) are provided. In this case, opaque metal materials having low resistance may be used as the first to fourth auxiliary lines 231a, 231b, 241a and 241b. Therefore, resistance of the first transparent electrode 232 and the second transparent electrode 242 may be reduced. As a result, the time required to charge a voltage in the first and second transparent electrodes 232 and 242 may be reduced, whereby the time required for mode switching from the transmissive mode of the light controlling device 200 to the light-shielding mode or the time required for mode switching from the light-shielding mode to the transmissive mode may be reduced.

Also, in the embodiment of the present invention, the first and third auxiliary lines 231a and 241a are arranged to correspond to the emission areas EA of the transparent display panel. As a result, in the embodiment of the present invention, openings of the transmissive areas TA may be prevented from being reduced due to the first and third auxiliary lines 231a and 241a.

Also, in the embodiment of the present invention, the widths of the second and fourth auxiliary lines 231b and 241b are formed to be narrower than those of the first and third auxiliary lines 231a and 241a. As a result, in the embodiment of the present invention, even though the second and fourth auxiliary lines 231b and 241b are formed in the transmissive areas TA, openings of the transmissive areas may be reduced within the minimum range.

Figure 10:
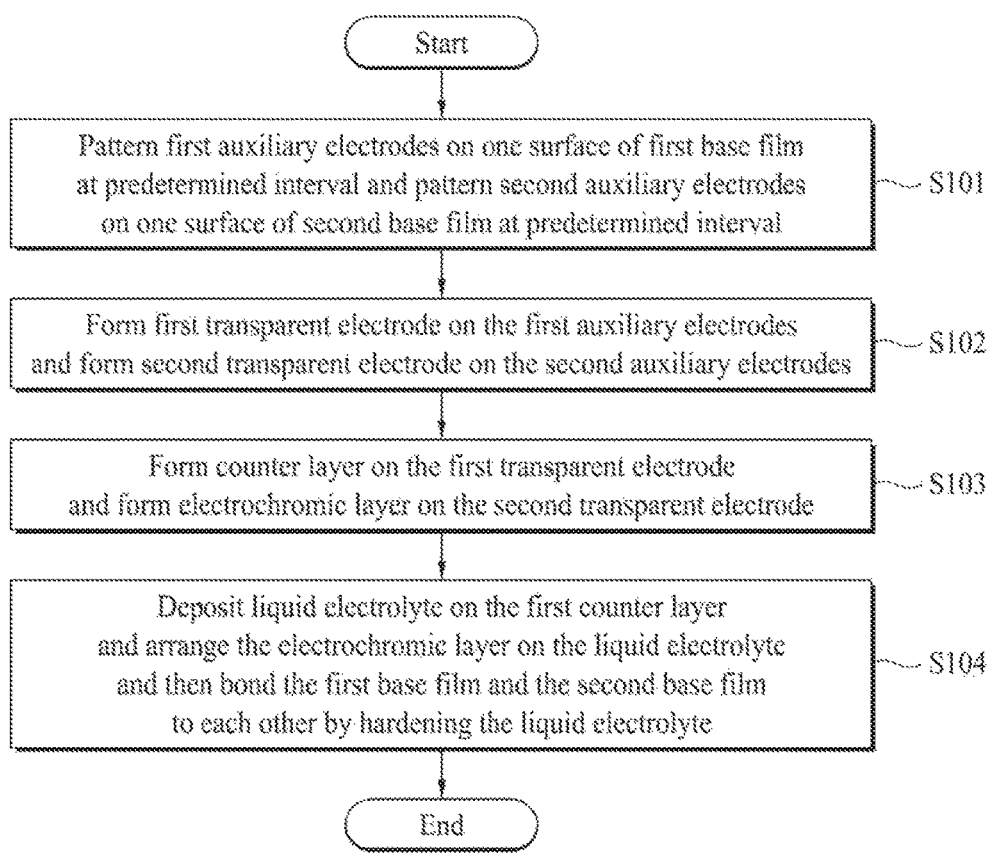
FIG. 10 is a flow chart illustrating a method for manufacturing the light controlling device of FIG. 6.

FIG. 10 is a flow chart illustrating a method for manufacturing the light controlling device according to FIG. 6. FIGS. 11A to 11F are cross-sectional views illustrating a light controlling device to describe the manufacturing method according to an example of FIG. 10. Hereinafter, the manufacturing method according to one embodiment will be described with reference to FIGS. 10 and 11A to 11F.

Figure 11A:
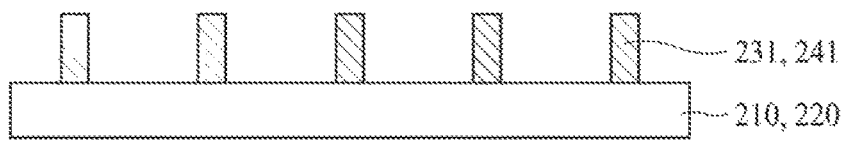
FIGS. 11A to 11F are cross-sectional views illustrating a light controlling device to describe a manufacturing method according to an example of FIG. 10.

First of all, as shown in FIG. 11A, the first auxiliary electrodes 231b are patterned on one surface of the first base film 210 at a predetermined interval, and the second auxiliary electrodes 241 are patterned on one surface of the second base film 220 at a predetermined interval.

Since the first and second auxiliary electrodes 231b and 241 shield incident light, it is preferable that the first and second auxiliary electrodes 231b and 241 are formed to correspond to the emission areas EA of the transparent display device to minimize light loss caused by the first and second auxiliary electrodes 231b and 241. However, in the embodiment of the present invention, since the width of the first and second auxiliary electrodes 231b and 241 is in the range of 0.1 μm to 10 μm, the first and second auxiliary electrodes 231b and 241 may be formed in the transmissive area TA. (S101 of FIG. 10)

Figure 11B:
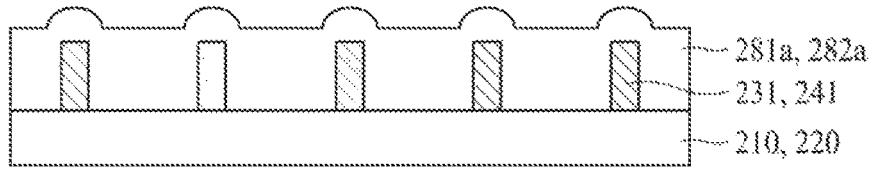
Figure 11C:
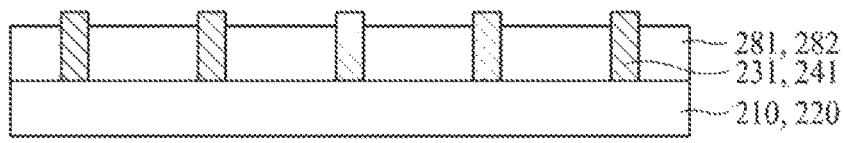

Secondly, as shown in FIGS. 11B and 11C, after a first insulating material 281a is deposited on the first auxiliary electrodes 231, the first insulating material 281a is subjected to ashing, whereby the first insulating film 281 is formed between the first auxiliary electrodes 231. Also, after a second insulating material 282a is deposited on the second auxiliary electrodes 241, the second insulating material 282a is subjected to ashing, whereby the second insulating film 282 is formed between the second auxiliary electrodes 241.

Figure 11D:
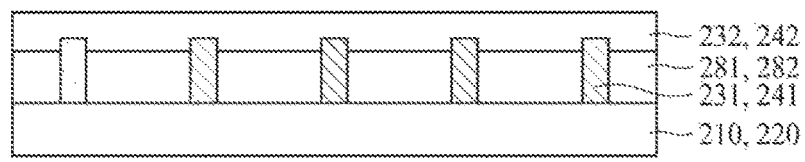

Thirdly, as shown in FIG. 11D, the first transparent electrode 232 is formed to cover the first auxiliary electrodes 231b and the first insulating film 281, and the second transparent electrode 242 is formed to cover the second auxiliary electrodes 241 and the second insulating film 282.

A resistance value per unit area of the first auxiliary electrode 231b is smaller than that of the first transparent electrode 232, and an area where the first transparent electrode 232 is formed may be reduced as the first auxiliary electrode 231b is formed, whereby a resistance value of the first transparent electrode 232 may be reduced. As the resistance value of the first transparent electrode 232 is reduced, the time required to apply a voltage to the first transparent electrode 232 may be reduced, whereby the time required to discolor the electrochromic layer 250 may be reduced. That is, in the embodiment of the present invention, the time required for mode switching from the transmissive mode of the light controlling device 200 to the light-shielding mode or the time required for mode switching from the light-shielding mode to the transmissive mode may be reduced.

Also, a resistance value per unit area of the second auxiliary electrode 241 is smaller than that of the second transparent electrode 242, and an area where the second transparent electrode 242 is formed may be reduced as the second auxiliary electrode 241 is formed, whereby a resistance value of the first transparent electrode 232 may be reduced. As the resistance value of the second transparent electrode 242 is reduced, the time required to apply a voltage to the second transparent electrode 242 may be reduced, whereby the time required to discolor the electrochromic layer 250 may be reduced. That is, in the embodiment of the present invention, the time required for mode switching from the transmissive mode of the light controlling device 200 to the light-shielding mode or the time required for mode switching from the light-shielding mode to the transmissive mode may be reduced. (S102 of FIG. 10)

Figure 11E:
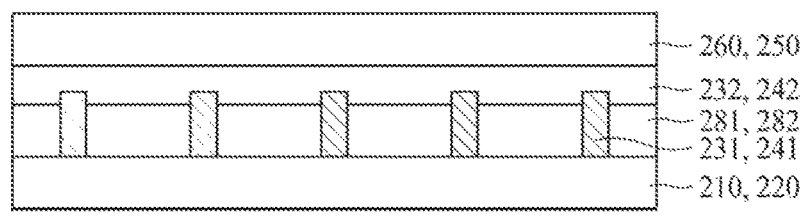

Fourthly, as shown in FIG. 11E, the counter layer 260 is formed on the first transparent electrode 232, and the electrochromic layer 250 is formed on the second transparent electrode 242.

The counter layer 260 may be formed by depositing or spraying a counter material on the first transparent electrode 232. The counter layer 260 corresponds to an assistance layer that allows the electrochromic layer 250 to actively perform an oxidation-reduction reaction, and may be omitted.

The electrochromic layer 250 may be formed by forming a core material layer on the second transparent electrode 242 or dipping the core material layer in an electrochromic material. The electrochromic layer 250 may be viologen. (S103 of FIG. 10)

Figure 11F:
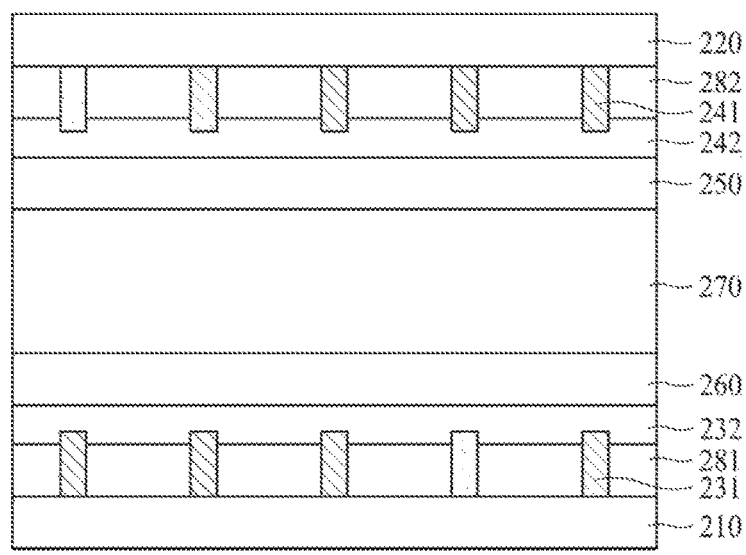

Finally, as shown in FIG. 11F, the electrolytic layer 270 is formed between the electrochromic layer 250 and the counter layer 260. In more detail, a liquid material that includes an electrolyte, a polymer and a UV initiator is deposited on the counter layer 260, and the electrochromic layer 250 is arranged on the liquid material and then the electrolytic layer 270 is formed by UV hardening. In this case, the polymer of the electrolytic layer 270 may serve to bond the electrochromic layer 250 and the counter layer 260 to each other while being hardened. That is, the electrolyte of the liquid state may be hardened to bond the first base film 210 to the second base film 220. (S104 of FIG. 10)

FIGS. 12A to 12D are cross-sectional views illustrating a light controlling device to describe step S101 according to another example of FIG. 10. The method for manufacturing a light controlling device according to another example of the present invention is generally the same as the method for manufacturing a light controlling device according to one example of the present invention except the step S101 of FIG. 10. Therefore, the step S101 according to another example will be described with reference to FIGS. 10 and 12A to 12D.

Figure 12A:
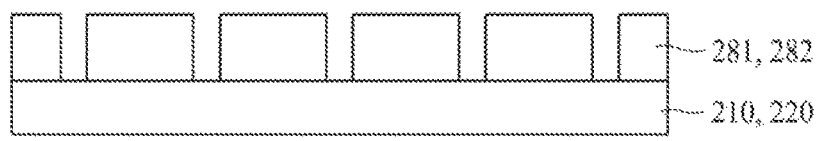
FIGS. 12A to 12D are cross-sectional views illustrating a light controlling device to describe step S101 according to another example of FIG. 10.

First of all, as shown in FIG. 12A, the first insulating films 281 are patterned on one surface of the first base film 210 at a predetermined interval, and the second insulating films 282 are patterned on one surface of the second base film 220 at a predetermined interval.

Figure 12B:
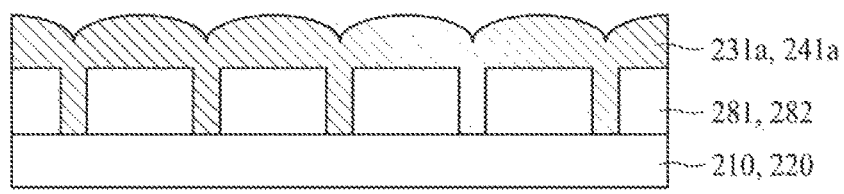
Figure 12C:
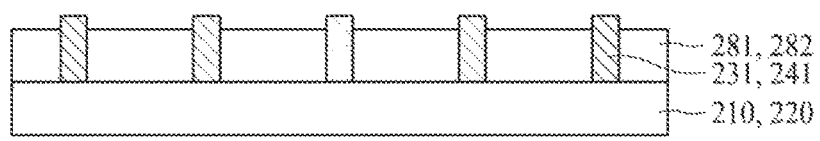

Secondly, as shown in FIG. 12B and FIG. 12C, after the first auxiliary electrode material 231a is deposited on the first insulating films 281, the first auxiliary electrode material 231a is subjected to etching, whereby the first auxiliary electrodes 231b are formed. Therefore, each of the first insulating films 281 is arranged between the first auxiliary electrodes 231. Also, after a second auxiliary electrode material 241a is deposited on the second insulating films 282, the second auxiliary electrode material 241a is subjected to etching, whereby the second auxiliary electrodes 241 are formed. Therefore, each of the second insulating films 282 is arranged between the second auxiliary electrodes 241.

Figure 12D:
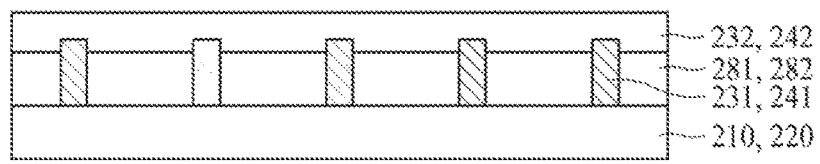

Thirdly, as shown in FIG. 12D, the first transparent electrode 232 is formed to cover the first auxiliary electrodes 231b and the first insulating films 281, and the second transparent electrode 242 is formed to cover the second auxiliary electrodes 241 and the second insulating films 282.

The light controlling device manufactured by the manufacturing method according to another example of the present invention may provide the same effect as that of the light controlling device manufactured by the manufacturing method according to one example of the present invention. That is, the time required for mode switching from the transmissive mode of the light controlling device 200 to the light-shielding mode or the time required for mode switching from the light-shielding mode to the transmissive mode may be reduced.

FIGS. 13A to 13F are cross-sectional views illustrating a method for manufacturing the light controlling device of FIG. 7.

Figure 13A:
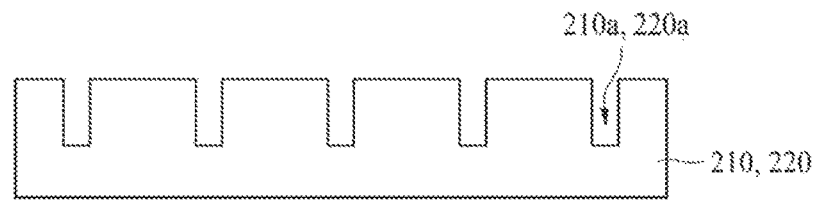
FIGS. 13A to 13F are cross-sectional views illustrating a method for manufacturing the light controlling device of FIG. 7.

First of all, as shown in FIG. 13A, the first insertion holes 210a are formed on one surface of the first base film 210 at a predetermined interval, and the second insertion holes 220a are formed on one surface of the second base film 220 at a predetermined interval. The first and second insertion holes 210a and 220a may be formed using a laser.

Figure 13B:
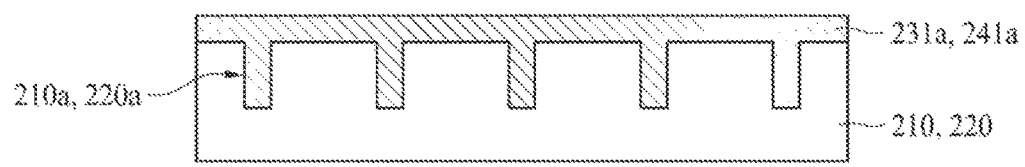
Figure 13C:
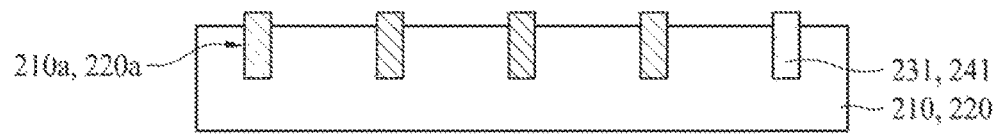

Secondly, as shown in FIGS. 13B and 13C, after the first auxiliary electrode material 231a is deposited on the first base film 210, the first auxiliary electrode material 231a is subjected to etching, whereby each of the first auxiliary electrodes 231b may be inserted into each of the first insertion holes 210a. Also, after the second auxiliary electrode material 241a is deposited on the second base film 220, the second auxiliary electrode material 241a is subjected to etching, whereby the second auxiliary electrodes 241 are formed. Therefore, each of the second auxiliary electrodes may be inserted into each of the second insertion holes 220a.

Figure 13D:
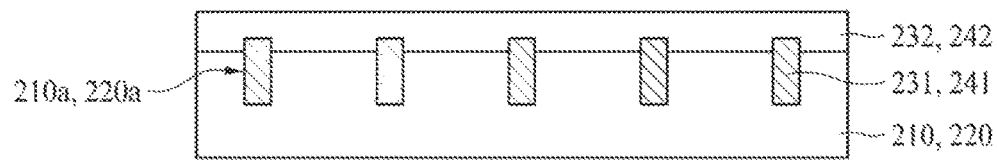

Thirdly, as shown in FIG. 13D, the first transparent electrode 232 is formed to cover the first auxiliary electrodes 231b and the first base film 210, and the second transparent electrode 242 is formed to cover the second auxiliary electrodes 241 and the second base film 220.

Figure 13E:
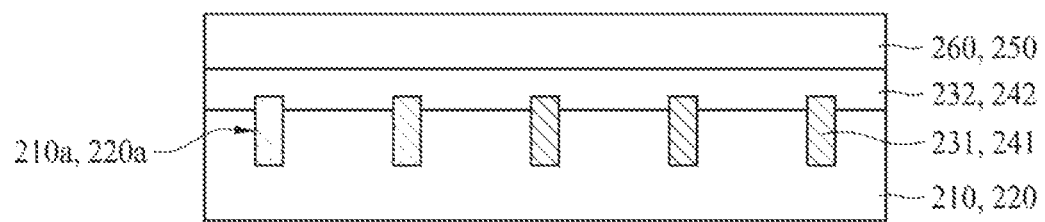

Fourthly, as shown in FIG. 13E, the counter layer 260 is formed on the first transparent electrode 232, and the electrochromic layer 250 is formed on the second transparent electrode 242.

Figure 13F:
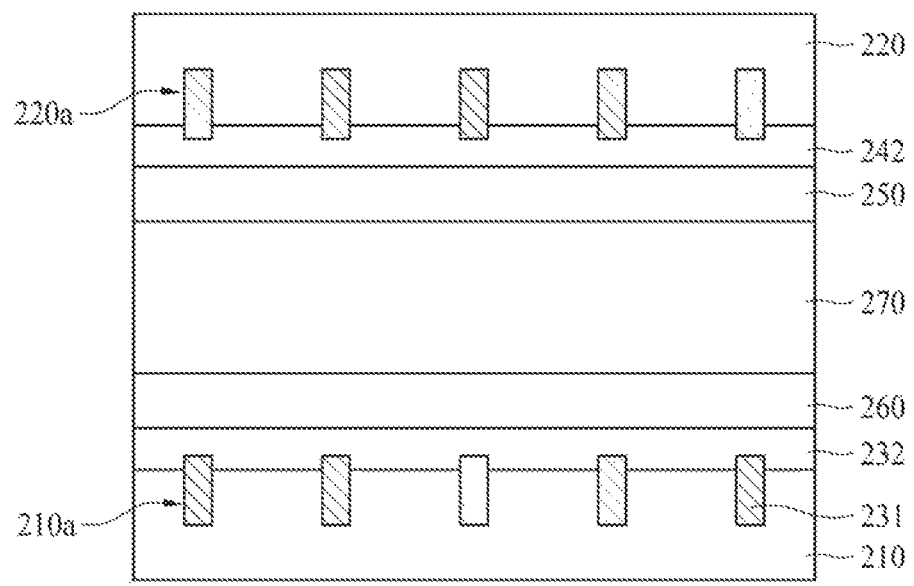

Finally, as shown in FIG. 13F, after a liquid electrolyte is deposited on the counter layer 260 and the electrolytic layer 270 is arranged on the liquid electrolyte, the liquid electrolyte is hardened to bond the first base film 210 and the second base film 220 to each other.

FIGS. 14A to 14D are cross-sectional views illustrating a method for manufacturing the light controlling device of FIG. 8.

Figure 14A:
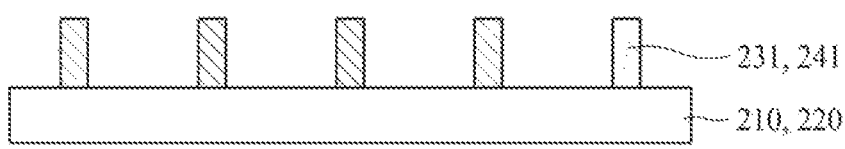
FIGS. 14A to 14D are cross-sectional views illustrating a method for manufacturing the light controlling device of FIG. 8.

First of all, as shown in FIG. 14A, the first auxiliary electrodes 231b are patterned on one surface of the first base film 210 at a predetermined interval, and the second auxiliary electrodes 241 are patterned on one surface of the second base film 220 at a predetermined interval.

Figure 14B:
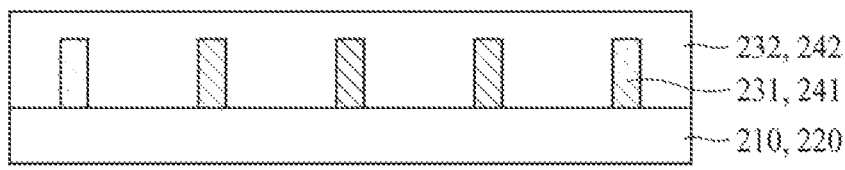

Secondly, as shown in FIG. 14B, the first transparent electrode 232 is formed to cover the first auxiliary electrodes 231, and the second transparent electrode 242 is formed to cover the second auxiliary electrodes 241. In this case, the first transparent electrode 232 is formed to be thicker than that of the first auxiliary electrode 231, and the second transparent electrode 242 is formed to be thicker than that of the second auxiliary electrode 241. Therefore, the surfaces of the first and second transparent electrodes 232 and 242 may be formed uniformly, and surface resistance may be reduced.

Figure 14C:
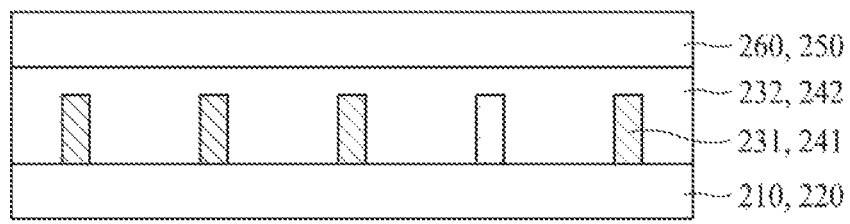

Thirdly, as shown in FIG. 14C, the counter layer 260 is formed on the first transparent electrode 232, and the electrochromic layer 250 is formed on the second transparent electrode 242.

Figure 14D:
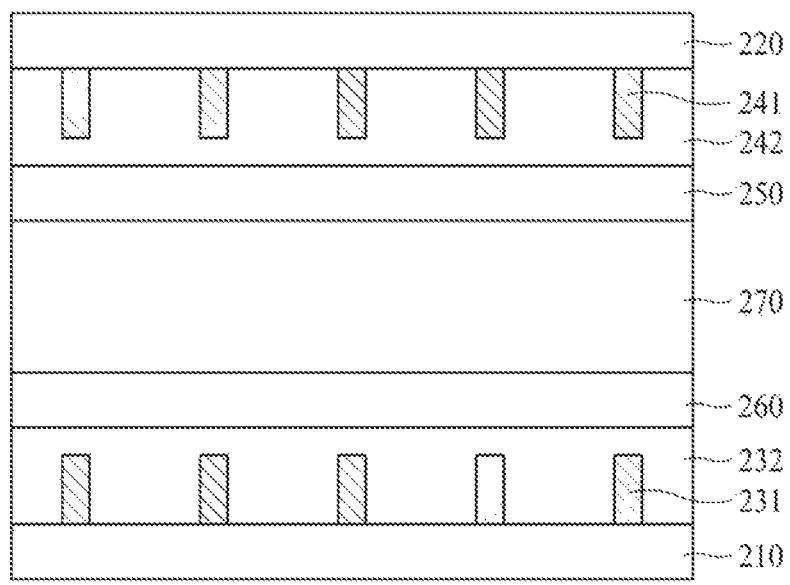

Finally, as shown in FIG. 14D, after a liquid electrolyte is deposited on the counter layer 260 and the electrolytic layer 270 is arranged on the liquid electrolyte, the liquid electrolyte is hardened to bond the first base film 210 and the second base film 220 to each other.

As described above, according to the embodiments of the present invention, the following advantages may be obtained.

In the embodiments of the present invention, since the first auxiliary electrode electrically connected with the first transparent electrode is provided between the first transparent electrode and the first base film, and the second auxiliary electrode electrically connected with the second transparent electrode is provided between the second transparent electrode and the second base film, surface resistance of the first and second transparent electrodes may be reduced as compared with the related art in which the first and second transparent electrodes are only provided. Therefore, in the embodiments of the present invention, the time required for mode switching from the transmissive mode to the light-shielding mode or from the light-shielding mode to the transmissive mode may be reduced.

Also, in the embodiments of the present invention, the first insulating film is formed between the first auxiliary electrodes, and the first transparent electrode is formed on the first auxiliary electrodes and the first insulating film. For this reason, since the first transparent electrode may be formed with planarization in the embodiments of the present invention, a crack may be prevented from occurring in the first transparent electrode at the sides of the first auxiliary electrodes due to the thickness of each of the first auxiliary electrodes.

Also, in the embodiments of the present invention, since the first auxiliary electrodes are inserted into the first base film, the first transparent electrode may be formed with planarization. Therefore, in the embodiments of the present invention, a crack may be prevented from occurring in the first transparent electrode at the sides of the first auxiliary electrodes due to the thickness of each of the first auxiliary electrodes.

Also, in the embodiments of the present invention, the first and third auxiliary lines arranged along the first direction and the second and fourth auxiliary lines arranged along the second direction crossing the first direction are provided. In this case, opaque metal materials having low resistance may be used as the first to fourth auxiliary lines. Therefore, resistance of the first transparent electrode and the second transparent electrode may be reduced. As a result, the time required to charge a voltage in the first and second transparent electrodes may be reduced, whereby the time required for mode switching from the transmissive mode of the light controlling device to the light-shielding mode or the time required for mode switching from the light-shielding mode to the transmissive mode may be reduced.

Also, in the embodiments of the present invention, the first and third auxiliary lines are arranged to correspond to the emission areas of the transparent display panel. As a result, in the embodiments of the present invention, openings of the transmissive areas may be prevented from being reduced due to the first and third auxiliary lines.

Also, in the embodiments of the present invention, the widths of the second and fourth auxiliary lines are formed to be narrower than those of the first and third auxiliary lines. As a result, in the embodiments of the present invention, even though the second and fourth auxiliary lines are formed in the transmissive areas, openings of the transmissive areas may be reduced within the minimum range.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A light controlling device comprising:
   a first base film and a second base film;
   first auxiliary electrodes arranged on one surface of the first base film facing the second base film, and patterned at a predetermined interval;
   second auxiliary electrodes arranged on one surface of the second base film facing the first base film, and patterned at a predetermined interval;
   a first transparent electrode arranged on the first auxiliary electrodes and including a first lower surface and a first upper surface;
   a second transparent electrode arranged on the second auxiliary electrodes and including a second lower surface and a second upper surface; and
   an electrochromic layer arranged between the first transparent electrode and the second transparent electrode,
   wherein an entirety of the first upper surface of the first transparent electrode is planarized and the first auxiliary electrodes extend into the first lower surface of the first transparent electrode, wherein an entirety of the second lower surface of the second transparent electrode is planarized and the second auxiliary electrodes extend into the second upper surface of the second transparent electrode, wherein the first upper surface is closer to the second lower surface than the second upper surface, and the second lower surface is closer to the first upper surface than the first lower surface, and wherein the first auxiliary electrodes are in contact with the first transparent electrode, and the second auxiliary electrodes are in contact with the second transparent electrode.

2. The light controlling device of claim 1, wherein each of the first auxiliary electrodes has a thickness thicker than that of the first transparent electrode, and each of the second auxiliary electrodes has a thickness thicker than that of the second transparent electrode.

3. The light controlling device of claim 2, further comprising:
first insulating films between the first auxiliary electrodes; and
second insulating films between the second auxiliary electrodes.

4. The light controlling device of claim 3, wherein each of the first insulating films has a thickness thinner than that of each of the first auxiliary electrodes, and each of the second insulating films has a thickness thinner than that of each of the second auxiliary electrodes.

5. The light controlling device of claim 1, wherein the first base film includes first insertion holes which are engraved and formed on the one surface, the second base film includes second insertion holes which are engraved and formed on the one surface, each of the first auxiliary electrodes is inserted into each of the first insertion holes, and each of the second auxiliary electrodes is inserted into each of the second insertion holes.

6. The light controlling device of claim 5, wherein the first transparent electrode is in contact with the one surface of the first base film and the first auxiliary electrodes, and the second transparent electrode is in contact with the one surface of the second base film and the second auxiliary electrodes.

7. The light controlling device of claim 1, wherein the first transparent electrode has a thickness thicker than that of each of the first auxiliary electrodes, and the second transparent electrode has a thickness thicker than that of each of the second auxiliary electrodes.

8. The light controlling device of claim 1, wherein each of the first auxiliary electrodes includes first auxiliary lines arranged along a first direction and second auxiliary lines arranged along a second direction crossing the first direction, and each of the second auxiliary lines has a width narrower than that of each of the first auxiliary lines.

9. The light controlling device of claim 1, wherein each of the first and second auxiliary electrodes has a thickness in a range of 1 μm to 2 μm.

10. The light controlling device of claim 1, wherein the thickness of each of the first and second auxiliary electrodes is greater than a width of each of the first and second auxiliary electrodes.

11. The light controlling device of claim 10, wherein the width of each of the first and second auxiliary electrodes in a range of 0.1 μm to 10 μm.

12. A transparent display device comprising:
a transparent display panel that includes transmissive areas and emission areas; and
a light controlling device arranged on at least one surface of the transparent display panel, the light controlling device including:
a first base film and a second base film,
first auxiliary electrodes arranged on one surface of the first base film facing the second base film, and patterned at a predetermined interval,
second auxiliary electrodes arranged on one surface of the second base film facing the first base film, and patterned at a predetermined interval,
a first transparent electrode arranged on the first auxiliary electrodes and including a first lower surface and a first upper surface,
a second transparent electrode arranged on the second auxiliary electrodes and including a second lower surface and a second upper surface, and
an electrochromic layer arranged between the first transparent electrode and the second transparent electrode,
wherein an entirety of the first upper surface of the first transparent electrode is planarized and the first auxiliary electrodes extend into the first lower surface of the first transparent electrode,
wherein an entirety of the second lower surface of the second transparent electrode is planarized and the second auxiliary electrodes extend into the second upper surface of the second transparent electrode,
wherein the first upper surface is closer to the second lower surface than the second upper surface, and the second lower surface is closer to the first upper surface than the first lower surface, and
wherein the first auxiliary electrodes are in contact with the first transparent electrode, and the second auxiliary electrodes are in contact with the second transparent electrode.

13. The transparent display device of claim 12, wherein each of the first auxiliary electrodes includes first auxiliary lines arranged along a first direction and second auxiliary lines arranged along a second direction crossing the first direction, and each of the second auxiliary lines has a width narrower than that of each of the first auxiliary lines.

14. The transparent display device of claim 12, wherein each of the second auxiliary electrodes includes third auxiliary lines arranged along a first direction and fourth auxiliary lines arranged along a second direction crossing the first direction, and each of the fourth auxiliary lines has a width narrower than that of each of the third auxiliary lines.

15. The transparent display device of claim 12, wherein a width of the first auxiliary electrodes and the second auxiliary electrodes is narrower than that of the emission areas.

16. The transparent display device of claim 13, wherein a width of the first auxiliary lines is narrower than that of the emission areas.

17. A method for manufacturing a light controlling device, the method comprising:
patterning first auxiliary electrodes on a first base film at a predetermined interval and patterning second auxiliary electrodes on a second base film at a predetermined interval;
forming a first transparent electrode including a first lower surface and a first upper surface on the first auxiliary electrodes;
forming a second transparent electrode a second lower surface and a second upper surface on the second auxiliary electrodes;

forming a counter layer on the first transparent electrode and forming an electrochromic layer on the second transparent electrode; and depositing a liquid electrolyte on the counter layer and arranging the electrochromic layer on the liquid electrolyte and then bonding the first base film and the second base film to each other by hardening the liquid electrolyte, wherein an entirety of the first upper surface of the first transparent electrode is planarized and the first auxiliary electrodes extend into the first lower surface of the first transparent electrode, wherein an entirety of the second lower surface of the second transparent electrode is planarized and the second auxiliary electrodes extend into the second upper surface of the second transparent electrode, wherein the first upper surface is closer to the second lower surface than the second upper surface, and the second lower surface is closer to the first upper surface than the first lower surface, and wherein the first auxiliary electrodes are in contact with the first transparent electrode, and the second auxiliary electrodes are in contact with the second transparent electrode.

18. The method of claim 17, further comprising:

forming a first insulating film by depositing a first insulating material on the first auxiliary electrodes, ashing the first insulating material and UV hardening the first insulating material; and forming a second insulating film by depositing a second insulating material on the second auxiliary electrodes, ashing the second insulating material and UV hardening the second insulating material, between the step of patterning the first auxiliary electrodes on the first base film at the predetermined interval and patterning the second auxiliary electrodes on the second base film at the predetermined interval and the step of forming the first transparent electrode on the first auxiliary electrodes and forming the second transparent electrode on the second auxiliary electrodes.

19. The method of claim 17, wherein the step of patterning the first auxiliary electrodes on the first base film at the predetermined interval and patterning the second auxiliary electrodes on a second base film at a predetermined interval includes:

forming first insertion holes, which are engraved, on one surface of the first base film and forming second insertion holes, which are engraved, on one surface of the second base film; and forming each of the first auxiliary electrodes inserted into each of the first insertion holes by depositing a first auxiliary electrode material on the one surface of the first base film where the first insertion holes are formed and patterning the first auxiliary electrode material, and forming each of the second auxiliary electrodes inserted into each of the second insertion holes by depositing a second auxiliary electrode material on the one surface of the second base film where the second insertion holes are formed and patterning the second auxiliary electrode material.

\* \* \* \* \*